United States Patent [19]
Baxter et al.

[11] 3,939,849
[45] Feb. 24, 1976

[54] FILTER ELEMENTS

[75] Inventors: Samuel Baxter, Penhow, England; Pushpkumar Dewanmal Changani, Glasgow, Scotland

[73] Assignee: Monsanto Chemicals Limited, London, England

[22] Filed: July 8, 1974

[21] Appl. No.: 486,549

Related U.S. Application Data

[63] Continuation of Ser. No. 193,710, Oct. 29, 1971, abandoned.

[30] Foreign Application Priority Data

Nov. 18, 1970  United Kingdom............... 54806/70
Apr. 16, 1971  United Kingdom................ 9646/71

[52] U.S. Cl. .............................. 131/269; 131/10 R
[51] Int. Cl.² A24B 15/027; A24D 1/04; A24F 1/02
[58] Field of Search .................................... 131/269

[56] References Cited
UNITED STATES PATENTS 3,884,030   5/1975   Baxter et al...................... 57/140 R

FOREIGN PATENTS OR APPLICATIONS 1,122,661   8/1968   United Kingdom................ 131/269
1,279,803   6/1972   United Kingdom................ 131/269
908,185   10/1962   United Kingdom................ 131/269
893,958    4/1962   United Kingdom................ 131/269
865,462    3/1971   Canada............................. 131/269
1,111,928   5/1968   United Kingdom................ 131/269

Primary Examiner—Robert W. Michell
Assistant Examiner—V. Millin
Attorney, Agent, or Firm—Russell E. Weinkauf

[57] ABSTRACT

A polyolefin filter for tobacco products and the like was prepared. The extruded element is an open-cell foamed polyethylene or polypropylene having a TPM filtration efficiency greater than 20 percent. The filter rod can be made by extruding polyethylene containing less than 0.2 moles of a volatile blowing agent per 100 grams of resin at a melt temperature between 130°C. and 150°C., the temperature of the die being between 120°C. and 136°C. Higher melt temperature and die temperature are required for polypropylenes.

18 Claims, 8 Drawing Figures

Inventors
SAMUEL BAXTER
PUSHPKUMAR D. CHANGANI
By *F. P. Shearin*
Attorney

100μ

100μ

300μ

200μ

200μ

120μ

FILTER ELEMENTS

This is a continuation, of application Ser. No. 193,710, filed Oct. 29, 1971. now abandoned.

BACKGROUND OF THE INVENTION

This invention relates to cigarette filters.

The increasing use of filters in cigarettes, not only for the purpose of removing tars and other undesirable substances from the tobacco smoke but also to save the cost of tobacco which would otherwise be thrown away in the butt-end, has led to the investigation and development of many kinds of filters.

Cigarette filters made for instance of crimped paper or cellulose acetate tow have met with commercial success, though these entail the use of relatively complex machinery for handling the loose starting materials which must be rolled in paper or otherwise bound together into the desired shape of filter before being incorporated in the cigarette. These particular types of filter can also be comparatively heavy. Many other types of filter have been investigated, among which are certain kinds of filters of foamed plastics. One problem here is that there is liable to be a free flow of tobacco smoke through the filter but an inadequate absorption of the substance it is desired to remove.

The best types of cigarette filter need to have an agreeable feel to the lips yet resist damage by high-speed cigarette-making machinery, they need to exert less than a certain degree of hindrance to the passage of tobacco smoke on drawing, and yet they must remove an adequate proportion of the undesirable substances.

These qualities are not easy to obtain. It is possible for instance by foaming such resins as polypropylene to obtain foamed products which sometimes have a potential as a cigarette filter. Nonetheless, not all such foams are suitable; some are quite useless and others very inefficient. For instance, it is evident in any event that an open-cell structure is necessary, because otherwise there will be no effective passage of the tobacco smoke through the filter at all. In some examples of open-cell foam, however, the tobacco smoke passes through the filter almost unhindered, with little or no removal of the undesirable substances present in the smoke. Thus foamed polyethylene and foamed polypropylene filters of various types have been proposed, but it has not previously been suggested that it is possible by forming a micro-structure of the nature described later in this specification to obtain a filter having the characteristics set out below, nor has any process for producing cigarette filters been described which would teach how to obtain such a microstructure.

SUMMARY

We have indeed now found that the behaviour of such a filter depends considerably on the micro-structure of the foam, and that if a correct type of structure is present a very effective filter can be obtained. In particular, if a thermoplastic high-density polyethylene resin or a thermoplastic polypropylene resin containing an expanding agent is extruded to form a foam, it is possible by controlling the conditions to obtain a product of this desired micro-structure. The precise nature of the micro-structure is a rather complicated matter and is dealt with at length later in this specification, though it can readily be recognized from the performance of the filter. Its formation needs specially controlled conditions of extrusion. However, we have found that by carefully controlling these conditions it is possible to extrude a rod of a foamed high-density polyethylene resin or polypropylene resin, which when cut up and used as cigarette filters is a considerable advance on many earlier filters.

It is possible, in fact, by adopting extrusion conditions of the type illustrated later in this description, to obtain a cigarette filter of a microstructure such that the filter is sufficiently hard to withstand high-speed handling, does not hinder the passage of the smoke unduly, and yet is capable of removing at least a minimum amount of the tarry substances present in the smoke. Moreover, in practice the filter normally has a smooth, non-porous skin which assists in preventing air from leaking into the filter in use. The hardness can be measured as a percentage figure using the definition given below, the passage of the smoke can be measured in terms of the pressure drop under certain conditions along a 10-millimeter length of the filter ($\Delta P_{10}$, as defined below), and the absorption from the smoke can be measured in terms of the TPM filtration efficiency, also defined below.

The new cigarette filter of the invention is in fact one comprising an extruded element of a substantially open-cell foamed thermoplastic polyolefin selected from the group consisting of high-density polyethylene resin and polypropylene resin having a cross-section corresponding to that of the relevant cigarette and a micro-structure such that the filter has a hardness greater than 50 percent, a $\Delta P_{10}$ less than 15 centimeters water gauge, and a TPM filtration efficiency greater than 20 percent.

It has moreover been found that a particularly advantageous cigarette filter according to the invention is one having a hardness greater than 80 percent, a $\Delta P_{10}$ of less than 10 centimeters water gauge and a TPM filtration efficiency greater than 30 percent. Preferably the resin employed in such a filter is a high-density polyethylene resin.

By the hardness of a cigarette filter is meant its hardness as measured by means of a Filtrona Tester (manufactured by Cigarette Components Limited), by a test in which a rod (for example a length of say 120 millimeters of the foamed resin having a mean diameter (D), for example about 7.8 millimeters, is compressed between two plates provided in the instrument. The rod is subjected to compression for 15 seconds by a load of 300 grams applied to opposite sides of the cylindrical surface of the rod and the average depression (A), that is, the decrease in diameter of the rod, is measured. The hardness is the diameter of the sample measured at a load of 300 grams and expressed as a percentage of the original diameter, that is, it is given by the following formula:

Hardness = $[(D-A)/D] \times 100$ percent.

By $\Delta P_{10}$ is meant the pressure drop of a filter, and this is measured by the following method. Air is pumped through a 10-millimeter length of the filter at a steady rate of 1050 cubic centimeters per minute as indicated on a rotameter gauge, and the resulting pressure difference across the filter is measured by means of a water manometer. The result is expressed in centimeters of water gauge.

The TPM filtration efficiency is a measure of the effectiveness with which the filter absorbs tar particulate matter, and is measured according to the following method. Filter tips of length 15 mm. are attached to cigarettes. These are smoked using a multiport smoking machine which takes one puff of 35 cc. of air over a period of 2 seconds every minute through each cigarette, the cigarettes being extinguished when 8 mm. of tobacco rod remains. The smoke is collected on a glass fibre pad held in a holder, the complete unit of pad and holder being commonly known as a Cambridge filter and such that the glass fibre pad retains all tar particulate matter from smoke passing through it. The smoke from five cigarettes is collected on each Cambridge filter, and a total of 10 cigarettes is smoked, the Cambridge filters being weighed before and after smoke collection to obtain a measurement of the weight of tar particulate matter collected. The tar particulate matter is similarly collected and weighed from the same number of cigarettes that are identical except that they are not fitted with the filter tips. The TPM filtration efficiency is calculated from the formula:

$[(S_1-S_2)/S_1] \times 100$ percent.

where $S_1$ is the delivery of tar particulate matter (mg/cigarette) for the plain cigarettes and $S_2$ is the delivery of tar particulate matter for the cigarettes having the filters.

In the instance of $\Delta P_{10}$ and TPM as defined above the values will of course be proportionately and appropriately different where a filter length of less or greater than 10 millimeters is in question.

As has been made clear above, very effective cigarette filters comprising an extruded element of substantially open-cell foamed resin can be obtained by use of carefully controlled extrusion conditions, and for a thermoplastic high-density polyethylene resin the process is one of extruding the resin containing a volatile blowing agent in an amount less than 0.2 moles per 100 grams of the final extruded product at a melt temperature between 130°C. and 150°C., the temperature of the die (that is the metal temperature measured within 5 millimeters of the metal/resin interface) being between 120°C. and 136°C. When the resin is a thermoplastic polypropylene resin the conditions are similar except that the melt temperature is between 160°C. and 180°C. and the die temperature is between 155°C. and 165°C. Cigarette filters made by these processes have excellent properties, and the values of hardness, $\Delta P_{10}$ and TPM referred to above can be achieved.

The melt temperature is the temperature of the mixture of resin and blowing agent immediately before it enters the extrusion die, as measured by a totally immersed fine thermocouple that is substantially unaffected by heat flows to or from its immediate environment. An example of such a thermocouple is described later in this specification.

Included within the invention are an extruded foamed rod from which the filters are produced and a cigarette having a filter according to the invention. By "rod" is meant the extruded foam in a length which can conveniently be handled and cut into shorter filter lengths in a further operation. Normally a rod has a length that is a simple multiple between 2 and 10 times the length of an individual filter, and it can therefore for example be in the range of 90 to 120 or 150 millimeters.

The thermoplastic resin is a thermoplastic highdensity polyethylene resin or a thermoplastic polypropylene resin, the former being preferred in general. Both these resins are normally made by a low-pressure polymerisation process employing for example a Ziegler or a Phillips catalyst, and are characterised by a linear molecular structure that is relatively free of branch polymer chains. A Natta catalyst can be used to make polypropylene resin. These resins have a high degree of crystallinity, and where there is a possibility of stereo-specificity they are preferably isotactic although syndiotactic resins are also useful. There can be present a small proportion, for example up to about 5 percent by weight, of a comonomer in the resin; for example in the case of polypropylene the comonomer can be ethylene or n-butene and with polyethylene the comonomer can be for example propylene or n-butene. The thermoplastic resin can also consist of a mixture of two or more polymers or copolymers.

High-density polyethylene has a density greater than 0.940, preferably between 0.950 and 0.970 grams per cubic centimeter. Preferably its melt index as measured by ASTM Test No. D-1238 is from 1 to 12 grams per 10 minutes, for example from 2 to 8 and especially from 2 to 5 grams per 10 minutes, at 230°C. under a 2.16 kilogram weight.

Where the filter is polypropylene this preferably has a melt index of from 1 to 12 grams per 10 minutes, for example from 2 to 10 and especially from 2 to 8 grams per 10 minutes as measured at a temperature of 190°C. and under a weight of 2.16 kilograms (ASTM Test No. D-1238).

The hardness of a cigarette filter of the invention as measured in the way described above is greater than 50 percent and it is often greater than 75 percent. Preferably it is more than 80 or 85 percent, and for many applications and particularly where the whole of the filter consists of a foamed element of the invention a hardness range of from about 90 or 92 percent to 99 percent includes the majority of the most desirable filters. Even a figure of 100 percent could be approached in favourable circumstances.

The pressure drop across the cigarette filter ($\Delta P_{10}$) is less than 15 centimeters, and in practice is usually less than 10 centimeters water gauge. A particularly acceptable pressure drop is one below 7 centimeters and sometimes considerably below, such as down to 0.5 centimeter; the pressure drop can be for example from 1 to 6 centimeters and particularly between 2 and 5 centimeters of water gauge.

In general the TPM filtration efficiency of a cigarette filter according to the invention is greater than 20 percent but it is preferably greater than 30 percent and can for example be in the range of from 35 to 60 percent or more.

For a single filter consisting of a foamed element of the invention a TPM in the vicinity of 30 or 35 percent is often very suitable, but where a composite cigarette filter is to be used only part of which consists of a foamed element of the invention this can in many instances usefully have a TPM greater than 35 percent and perhaps up to 60 or 70 percent or even higher.

The cigarette filter is usually cylindrical in shape and of the same diameter as the cigarete. It can for instance be 0.6 to 0.9 centimeters in diameter and for example from 0.8 to 2 centimeters in length, particularly from 1.0 to 1.5 centimeter, although other shapes and sizes can optionally be used. For example, longer filters, such as 2.5 centimeters long, can be used if desired and there is no fundamental reason why the filter should not be of for example oval rather than circular cross-section.

The density of the cigarette filter of the invention is preferably relatively low, usually not more than 0.15 gram per cubic centimeter and preferably from 0.015 to 0.1 gram per cubic centimeter, such as 0.03 to 0.08 gram per cubic centimeter. Between 0.04 and 0.07 gram per cubic centimeter is often a very suitable density.

There has been mentioned above our discovery that the open-cell foamed resin element needs to have the right microstructure if it is to fulfil the conditions necessary for a good cigarette filter. This micro-structure is normally of a fibrous nature, and arises because of the existence of fibre elements that bridge the perforations in the cell walls, the perforations being of course present because of the open-cell character of the foamed resin. The majority of the cells of the foam, that is to say more than half of them, have walls containing perforations bridged by one or more (and in practice considerably more) fibre elements. Usually the proportion of such cells is from 70 or 85 percent upwards, the materials within the higher ranges being particularly desirable in many instances; in certain circumstances the percentage can approach 100 percent. The number of cell walls containing perforations in any one individual cell can vary; there can be occasional cells containing a single perforated cell wall, or none at all, but because such cells cannot contribute to the through flow of smoke they are in a minority. In practice a open-cell of the foamed resin contains two, three or more perforated cell walls, including the preferred case where the majority (or indeed sometimes all) the cell walls are perforated in the particular way described; it follows that the majority of the cell walls of the foamed resin will then contain perforations. An especially preferred open-cell foamed resin is one in which the majority of the cell walls of more than 85 percent of the cells contain perforations that are bridged by fibre elements. Because of the relatively large number of perforations in the cell walls the structure of the foamed resin resembles in some respects that of a reticulated foam (that is to say a foam having a "skeleton" or three-dimensional network of thicker elements), the reticular structure being formed by the resin contained in the boundaries between the perforated walls of the cells, these boundaries having been enlarged by the resin originally present in the cell walls, although the reticulated structure of the foamed resin elements of the invention is of course distinguished from other reticulated foams by the presence of the bridging fibre elements giving the special properties described.

Fibre elements are referred to and not fibres because the elements are preferably interconnected with each other or with the part of the cell wall that forms the boundary of the perforation. Accordingly the number of loose "ends" due to the presence of "fibres" as such is low and in many cases there are no such loose ends.

An individual perforated cell wall can contain one or two or more perforations but generally the number is relatively small, for example less than 5 perforations, and in general the preferred number is one. In most instances perforations take up the major part of the appropriate cell wall and usually more than 60 percent, for example from 70 to 95 percent, or more, per cent, of the total surface area is accounted for by the perforations. In the preferred structures a cell wall contains a single perforation that takes up the major part such as from 70 or 80 to 95 percent of the total area of the wall, and here the structure resembles most closely the reticulated form previously referred to although it is again distinguished from other reticulated foams by the presence of the bridging fibre elements. There are thus in these preferred structures both the fine bridging fibre elements and a reticular structure of thicker elements often in part rod-like for example, although many different cross-sections are possible. The thicker elements are often 10 to 100 times thicker than the fibre elements on average, but wide variations in the thickness of both are possible. It is believed that the presence of both these types of elements is responsible for the particularly useful combination of properties possessed by the cigarette filters the reticular structure for example contributing to the hardness and the fibre elements giving the filtration properties.

Each perforation can be bridged by one or more fibre elements and in individual instances the number of fibre elements per perforation can be up to 100 or more, such as from 1 to 100. In some instances the number of fibre elements bridging a perforation is within the range of from 1 to 20 or 50, in other cases 200 or 300 or more. On average there is more than one fibre element per perforation. The fibre elements can be of substantially circular or of some other cross-section. A fibre element preferably has a thickness of less than 10 microns, its thickness usually being of the order of from 0.1 to 2 microns, for example about 1 micron. The fibre elements are often (but not always) branched or interconnected to form a two-dimensional array of interconnected fibre elements in the form of a fine web that extends across part, often the major part, of the perforation area. If the web is complex it can be associated with a higher $\Delta P_{10}$, but this effect can be compensated for by having a relatively coarse reticular cell structure. In one type of preferred structure, the majority of the cell walls of the foamed resin element each contain a single perforation that takes up the major part of the cell wall, the perforation being bridged by a web of interconnected fibre elements.

The perforations can be of roughly circular or elliptical shape but they can also be quite frequently of entirely irregular shape, and in the most preferred structures where the cell wall contains a perforation extending substantially over the whole of the cell wall the shape will be polygonal, and its dimensions will accordingly depend mainly on the surface area of the original cell wall.

Preferably most of the cells have a diameter within the range of from 0.004 to 0.1 centimeter, for example from 0.01 to 0.05 centimeter, and the cell walls can have an average surface area of from $3 \times 10^{-5}$ to $2 \times 10^{-2}$, especially from $2 \times 10^{-4}$ to $5 \times 10^{-3}$ square centimeter.

The open-cell foamed resin can also contain some cell walls that are not of the kind described above but for example are perforated by a multiplicity of simple holes that are small in relation to the total surface area of the cell wall. These structures if present account for the minority of cell walls however, and foams that consist substantially of cell walls containing perforations bridged by fibre elements are the usual ones.

BRIEF DESCRIPTION OF THE DRAWINGS

Examples of open-cell foamed resin cigarette filter elements according to the invention are illustrated in FIGS. 1 to 5 of the accompanying photographs taken with a scanning electron microscope.

FIG. 3 also demonstrates that cell walls having different structures can be present in the open-cell foamed resin. For instance the upper arrow indicates an intact cell wall free from perforations.

FIG. 6 illustrates the micro-structure of a very effective high-density polyethylene element for a cigarette filter; there is a three-dimensional reticular structure composed of red-like elements with webs of fine fibre elements bridging the original cell walls.

FIG. 7 illustrates the micro-structure of a portion of an open-cell polyurethane foam. The photograph shows a single cell and parts of the adjacent cells which clearly have a simple reticular structure of a three-dimensional array of ribs. The total absence of bridging fibres in this reticular structure is one of the properties that distinguishes it from the open-cell foamed resin cigarette filters of the present invention as exemplified in FIGS. 1 to 4 and 6.

FIG. 8 shows the micro-structure of a portion of an open-cell urea-formaldehyde foam. This photograph shows a number of cell walls perforated by holes unassociated with the characteristic fibrous micro-structure of the cigarette filters of the invention.

DESCRIPTION OF THE PREFERRED EMBODIMENTS

Figure 1:
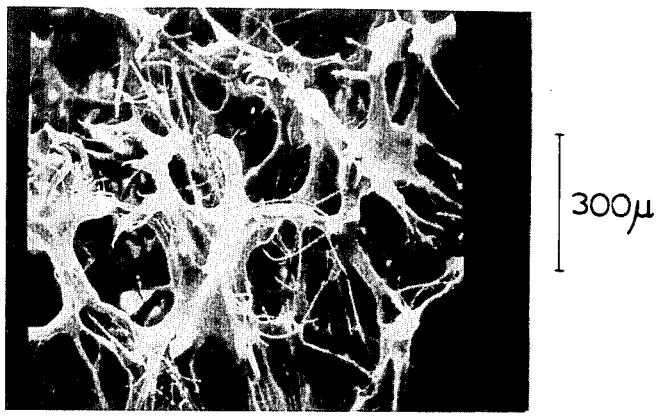
FIG. 1 illustrates the micro-structure of a preferred filter element according to the invention. A number of cells are shown and most of the cell walls each contain a single large perforation that is bridged by fibre elements. In this instance the perforations are so large that they occupy almost all the cell walls and the micro-structure as a whole takes on a complex appearance; there is a reticular structure bridged with fine fibre elements many of which are interconnected with one another.

When cigarette smoke flows through a filter having the preferred micro-structure, tar particles become trapped on the fibre elements giving a good TPM filtration efficiency figure. On the other hand, there is little resistance to the flow of gas or vapour constituents in the smoke, and the pressure drop across the filter is low. Also, the relatively strong open-cell foam structure gives the filter hardness. The foamed resin has the added advantage that it can, under suitable conditions as described in this specification, be produced continuously and directly by extrusion. When it is produced by extrusion through a circular die orifice the resulting cylindrical strand can be cut up into suitable portions, and this method allows the properties and dimensions of the extruded material, and hence of the cigarette filters cut from it, to be closely controlled. The shape and size of the die orifice are one determining factor, and these are chosen so as to give the desired product.

Thus a very effective cigarette filter is made by a process of extruding a strand of the foamed resin with the required micro-structure and having a transverse cross-section substantially corresponding to that desired in the final filter element. The strand is cut into pieces that are the length of an individual filter element or (for ease of handling) into intermediate pieces (that is to say rods) that are a simple integral multiple of this length, preferably from 2 to 10 times the length of an individual filter element; the production of rods is the standard procedure. THe extrusion process is simple and efficient and avoids many difficulties in the construction of the filter element; for instance there is no need to use adhesive or wrapping paper to form the filter element into an appropriate shape or to use material in the form of a tightly rolled cylinder. Moreover a filter can be produced with properties that make it particularly suitable in cigarettes. An extruded strand of the foamed resin in practice usually has a smooth, non-porous, skin which prevents air leaking into filters made from it when in use and can make some contribution to the hardness of the filter. The skin also obviates wrapping the filter in paper before incorporation in a cigarette.

While it is preferred that the cigarette filter should consist wholly of the extruded foamed resin element, a portion of some other substance such as for example paper wadding or cellulose acetate tow can of course be combined with the proportionately smaller foamed resin element to make a composite filter. Foamed elements having a relatively high TPM filtration efficiency (60% for instance) are particularly useful for such composite filters. In such a composite filter the element of extruded foam according to the invention can also be somewhat less hard than would otherwise be employed. In a composite filter the extruded foamed element can be in any position, for example it can be located before or after a different component.

The extrusion die is preferably a simple orifice of circular cross-section, and can for example have a diameter of 1 to 3 millimeters, more preferably 1.5 to 2 millimeters. A "land," that is the length of the orifice measured along the extrusion direction, from 1 to 10 times the orifice diameter, is often suitable although this dimension can often be greater if desired, for example to increase the back pressure behind the die where a low-viscosity resin is being extruded. On the other hand, a die having a very short land, only 0.1 to 1 millimeter for example, has been successfully used and was found to give a fine-celled product. Very often, however, a land of from 1.5 to 3 times the orifice diameter is found to be suitable. The entrance to the orifice can be flared or stepped if desired. Preferably the die exit is plain, although this can be slightly flared if desired.

In a preferred process for making a filter element according to the invention the extruded open-cell foam is produced by a direct-injection extrusion process in which a blowing agent is injected into the heat-plasticised resin as it is fed along the length of the barrel of a screw-extruder.

The extruder is preferably a screw extruder and preferably comprises plasticising, injection, mixing and cooling zones. In order to obtain the desired microstructure in the extruded foam a number of factors need to be carefully controlled. For instance the melt and the die temperatures are important factors in the production of foamed resins suitable for use in the cigarette filters of the invention.

It has been mentioned that the melt temperature (that is, the temperature of the mixture of resin and blowing agent behind the die entrance) needs to be measured with a totally immersed fine thermocouple that is substantially unaffected by heat flows to or from its immediate environment. This means that the junction of the thermocouple needs to be physically small and that it is so far as possible thermally insulated from supports or other objects that might be at a substantially different temperature. One construction that has been found useful comprises a stainless steel tube of outside diameter 1.5 millimeter containing fine iron and constantan wires insulated with powdered magnesia and brazed or welded together to one closed end of the tube. The tube can be inserted into the extruder transversely to the direction of the melt flow but preferably the tube is bent at a right angle so that the end three centimeters or so of the tube extend along the melt flow direction and the junction itself is positioned about half a centimeter or less behind the die entrance.

The melt temperature employed mainly depends on the nature of the resin, and particularly whether it is high-density polyethylene or is polypropylene. Thus for high-density polyethylene the melt temperature is between 130°and 150°C., and preferably between 134°C. and 146°C. It can for instance be between 136°C. or 137°C. and 140°C. or 142°C. for good results. Where a polypropylene resin is employed the temperature is higher, in the range of 160°C. to 180°C., and preferably between 162°C. or 165°C. and 175°C; a temperature between 167°C. and 170°C. is often especially useful. In many instances the melt temperature is in the region of a temperature which is between 5°C. less than and 15°C. greater than the crystalline melting point of the resin; for high-density polyethylene for example this point is about 135°C.

A particularly sensitive temperature factor is the temperature of the die. This needs to be measured within 5 millimeters of the orifice itself, that is, of the interface between the extruding resin and the metal of the die; otherwise the result obtained can be misleading because of any temperature gradient that might exist outwards from the orifice into the body of the die. When the die is constructed of a relatively bad heat conductor such as steel, the measurement should be made as close as possible to the orifice; for a better conductor such as brass 5 millimeters is normally close enough. The die temperature can for instance be measured by drilling to within 5 millimeters of the orifice and inserting the tip of the fine thermocouple described above in connection with the measurement of melt temperature. Normally the die temperature is not substantially higher than the melt temperature, and is usually equal to or lower than the melt temperature. When using the small amounts of volatile blowing agent employed in extruding the filter elements of the invention, it is most surprisingly found that careful control of the die temperature to within a few degrees Centigrade leads to formation of the desired micro-structure Too high a die temperature results in collapse of the extruding foam to a thin strand useless in a cigarette filter. On the other hand, a die temperature only three or four degrees lower leads to unstable extrusion, with uncontrollable variations in thickness and density of the extruded product. Between these two extremes, a product having the desired micro-structure is obtained, and it should be emphasised again that the die temperature range is very narrow, and that this effect is not observed where too much blowing agent is employed. The exact die temperature to be employed in a particular case depends mainly on the amount of blowing agent and the rheological properties of the resin, and to a lesser extent on the presence or absence of a nucleating agent or filler and on the geometry of the extruder and die, but it can be found by experiment using the criteria given above. for highdensity polyethylene for example it will be found that the correct die temperature lies between 120°C. and 136°C., and is usually between 125°C. and 135°C. and often between 126°C. or 127°C. and 133°C. or 134°C. In the case of polypropyles the die temperature will be between 155°C. and 165°C., and often a temperature between 157°C. and 163°C., such as between 159°C. and 162°C., is necessary.

The proportion of blowing agent is expressed in this specification in terms of the number of moles per 100 grams of the final extruded product, and by the latter is meant the weight of the extruded product after the blowing agent and any other volatile constituents of the extrudate have diffused into the atmosphere. Such diffusion takes place extremely rapidly and is normally substantially complete with in a few seconds. The proportion of blowing agent is a most important factor in ensuring the formation of the desired micro-structure. Too little of the blowing agent, for example 0.01 moles per 100 grams of the final extruded product, can result in a coarse open-cell foam without any fibrous microstructure. This is not suitable as a cigarette filter because it does not retain sufficient tar. Equally an amount of blowing agent greater than 0.2 moles per 100 grams of the final extruded product, for example 0.22 moles, tends to change the nature of the foam and often results in a high value for ΔP or even a substantially closed-cell structure. Larger amounts still, such as 0.27 moles per 100 grams of the final extruded product, can give a foam having some open cells, but the product lacks sufficient hardness, resists the flow of air too much and has a low filtration efficiency when employed in lengths sufficiently short to give an acceptable pressure drop. In general according to the invention, much less blowing agent is used than is normally employed in extruding a foamed resin of similar density, and the proportion of blowing agent is in any event not more than 0.2 moles per 100 grams of the extruded product; it is preferably from 0.02 or 0.05 to 0.17 such as from 0.05 to 0.13 moles per 100 grams of the final extruded product. Surprisingly, the optimum extrusion temperatures do not appear to be much affected by the proportion of blowing agent provided the latter is below the critical amount. It is therefore convenient when establishing the correct extrusion conditions to set firstly the melt temperature within the stated range, using about 0.17 or 0.18 moles of blowing agent per 100 grams of the final extruded product and a die temperature at the top of the stated range, then to lower the die temperature to achieve stable extrusion of an uncollapsed foamed product and finally progressively reduce the amount of blowing agent (at the same time raising the melt temperature slightly if necessary so as to maintain stable extrusion) until tests performed on samples of the product as described above show that the correct balance of properties and the right microstructure has been achieved. Final achievement of the desired filter element is obtained by small adjustments up or down in melt or die temperature until all the characteristics of the foam are as required. In this respect, for example, an increase in melt temperature can lead to a decrease in $\Delta P_{10}$ of the product, the die tip temperature can influence the filter size, and a further small decrease in blowing agent can also decrease $\Delta p_{10}$.

It is very often found that for high-density polyethylene the extrusion conditions lie within the range of 1 to 10 percent by weight of blowing agent based on the weight of polyethylene (which for the preferred blowing agent isobutylene corresponds to 0.018 to 0.18 moles per 100 grams of extruded product), with a melt temperature of 135°C. to 145°C. and a die temperature 128°C. to 135°C.

In many instances the volatile blowing agent is one that is a gas or vapour under normal atmospheric conditions (such as 20°C. and 1 atmosphere pressure), but which while under pressure before extrusion is present in solution in the heat-softened thermoplastic resin. The blowing agent can also be one, such as pentane or a pentane fraction, that is liquid under normal conditions. Examples of volatile blowing agents that can be used include lower aliphatic hydrocarbons (that is to say, those containing up to 5 carbon atoms) such as methane, ethane, ethylene, propane, propylene, butane, a butylene (especially isobutylene), or a pentane; a fluorocarbon such as dichlorodifluoromethane; a low boiling point ester such as methyl or ethyl acetate; acetone; and inorganic gases such as carbon dioxide or nitrogen. Also the blowing agent can be a polar compound such as for example water, or a low boiling point alcohol such as methanol, ethanol or propanol. Mixtures of two or more volatile blowing agents can be used if desired.

The pressure under which the blowing agent is injected into the extrusion system may be quite low, and although higher pressures can be used if desired there is not normally any advantage to be gained by this, the injection pressure being largely a matter of extruder screw design. For example, the pressure profile along the length of the extruder can rise to a maximum in the platicising section and fall to substantially atmospheric pressure at the injection point before rising again in the mixing and cooling zones, finally falling to atmospheric pressure again at the die exit.

The blowing agent is in many instances preferably employed in conjunction with a nucleating agent, which assists in the formation of a large number of relatively fine cells. A wide range of nucleating agents can be employed, including finely divided inert solids, especially for example calcium carbonate, which can be in the form for instance of calcite, chalk or ground limestone. Where calcium carbonate is employed it can optionally be used in conjunction with a small proportion of sodium carbonate. Other suitable finely divided nucleating agents include talc, silica, alumina and titanium dioxide. A salt of an aliphatic carboxylic acid containing up to 16 carbon atoms as described in British Pat. Specification No. 1,148,119, for example calcium propionate or acetate, or a salt of an aromatic carboxylic acid as described in British Pat. Specification No. 1,203,498, for example calcium benzoate, gives good results. A small proportion of the nucleating agent, for example up to 5 percent by weight of the resin, is usually effective. Often the amount of nucleating agent employed is in the range of from 0.1 to 5 percent by weight, preferably from 1 to 2 percent by weight. Where the nucleating agent is a finely divided inert solid such as calcium carbonate, larger amounts such as for instance 10 percent to 30 percent can be present if desired and in such cases the finely divided solid acts additonally as a filler. By choice of a suitable die, particularly one that has very short land or is otherwise designed to exert a high rate of shear on the extruding foamable resin, it is however often possible to dispense with a nucleating agent altogether.

Uniform dispersion of a nucleating agent can be assisted by the additional presence of an adhesive material The adhesive material can act as a carrier for the nucleating agent and in general it can be chosen from a wide variety of substances provided it is thermally stable under the extrusion conditions and it does not adversely interact with the nucleating agent or the resin. Amongst the materials that are especially suitable there are included polyisobutylene, methyl cellulose, a higher molecular weight liquid hydrocarbon, and a polyalkylene glycol. Preferably the adhesive material is present in the process to the extent of from 3 to 15 percent by weight based on the nucleating agent. A preferred adhesive material is a polyalkylene glycol which is best employed in quantities ranging from 5 to 10 percent by weight based on the nucleating agent. The polyalkylene glycol is, of course, one that is non-reactive with the polymer and nucleating agent and is thermally stable under the extrusion conditions, and it can be, for example, polymethylene glycol, polyethylene glycol, polybutylene glycol, or polyisobutylene glycol. Polyethylene glycol is the particularly preferred glycol and excellent results have been obtained using about 10 percent bu weight based on the nucleating agent. In general the polyethylene glycol employed has a molecular weight of from 200 to 600, more preferably from 300 to 500, for example about 400.

After extrusion the foamed strand is conveyed away from the die. Preferably it is pulled away at a speed slightly higher than the extrusion speed; this assists in controlling the final diameter. It is desirable to control the diameter of the strand by additional means, and it has been found that very accurate and consistent size control can be achieved by passing the newly extruded strand through a sizing tube and thereafter cooling it. The cooling treatment preferably comprises passing the strand through another tube that is cooled. Preferably the cooling tube has a cross-section substantially the same as that of the sized strand so that contact between the surface of the strand and the walls of the channel is made and heat is withdrawn from the strand surface.

The sizing and cooling tubes preferably have highly polished interior surfaces, and for example final adjustments of their size is conveniently done by honing. Each tube should preferably have a diameter at its exit end substantially the same as that desired in the foamed resin strand (and accordingly in the final cigarette filter), although the exit end of the sizing tube can be slightly smaller because a small amount of expansion takes place after the strand leaves this tube. The inlet end of each tube can be slightly larger than the strand. Preferably each tube is constructed so that it can be readily split longitudinally and reassembled to assist in threading the foamed strand through it on starting up the apparatus.

The sizing and cooling tubes can each be for instance from 1 to 10 centimeters long. About 5 centimeters is often a suitable length.

The sizing tube is preferably situated between 15 and 200 centimeters for example 20 to 100 centimeters, from the outlet of the extrusion die. At this position the foamed resin strand is substantially fully expanded but has not cooled sufficiently to solidify its interior. The heat of extrusion warms up the sizing tube, for instance to about 100°C., and although external heating or cooling can be applied if this is found desirable it is usually convenient to rely on natural air cooling.

After leaving the sizing tube the foamed strand preferably passes through air for a few centimeters for example 5 to 20 centimeters, before it enters the cooling tube. Preferably the cooling tube is set in the end wall of an elongated trough of cooling water (or other suitable liquid) into which the strand passes as it emerges from the cooling tube. The water in the trough thus cools the tube by conduction, and further cools the strand as it passes through the trough. The water temperature can for example be 10° to 40°C., preferably 10° to 30°C. The trough can for example be 1 to 3 meters long, although it can if desired be shorter or longer. Preferably the strand leaves the trough through a sealing tube which can conveniently be similar to the cooling tube. More than one sealing tube can be employed if desired and a blast of air can be used to blow any surplus water off the strand.

The foamed strand needs to be pulled through the tubes, and it has been found that this "haul-off" rate can be used as a fine control of the diameter. For example, a variation in the haul-off rate of 3 percent has been found to produce a change in the strand diameter of about 1 percent. Preferably the haul-off system comprises rollers or an endless belt and is faced with a soft material such as polyurethane foam so as to avoid crushing the foam structure. After the haul-off system the foamed strand can be stored before use but is more conveniently cut up into rods as mentioned above. The rods are then normally cut into multiples of two filters, tobacco is rolled in the form of a cigarette on each side of the "double" filter, and this is finally cut across the centre to give two cigarettes.

The foamed resin of the invention is not only useful in cigarettes but is also applicable to general filtration, for example air conditioning, central heating, mining, oil or water filtration and so on. It is particularly useful in filtering entrained dust or smoke particles from streams of air or other gases.

This invention is illustrated by the following Examples:

EXAMPLE 1

This Example describes cigarette filters according to the invention of high density polyethylene, and their production by a method according to the invention.

High density polyethylene of density 0.965 grams/cc crystalline melting point 135°C. and melt index 4.5 grams per 10 minutes (at 190°C. under a 2.16 kg. weight) was blended with 5 percent by weight, based on polyethylene, of calcium propionate to act as nucleating agent and 0.5 percent by weight of polyethylene glycol of molecular weight 400 to act as an adhesive. The mixture was fed to a 3.81 cm. diameter screw extruder equipped with a two-stage screw, a nozzle for injecting fluids into the extruder barrel, and a circular orifice die of diameter 1.58 mm. and land 3.18 mm. The screw speed was 21 revolutions per minute, the throughput was 47 grams per minute and isobutylene was injected as blowing agent at a rate corresponding to 0.128 moles per 100 grams of the final extruded product.

The temperature in the plasticating zone of the extruder, that is, the part upstream of the injection point was 180° to 200°C. but cooling was applied downstream of the injection zone and as a result the melt temperature immediately behind the die was 138°C., measured using a fine thermocouple as described above. The temperature of the die, measured as described above, was 130°C. These conditions gave stable extrusion to an open-cell foamed polyethylene rod having a smooth exterior skin. After passing through air for 20 centimeters, the rod was pulled into a cylindrical brass tube of internal diameter 0.815 cm. and length 5 cm., and thence into a second cylindrical brass tube of internal diameter 0.875 cm. and length 5 cm. The second tube was set in the end wall of a water trough of length 3 meters so that it was thereby cooled, the water temperature being 20°C. The rod passed along the trough and at the end passed through two more cylindrical tubes of length 5 cm. and internal diameter 0.875 cm., to act as a water seal. After passing between haul-off rollers faced with soft polyurethane foam it was cut into 90 mm. lengths.

It was found that all the lengths were of circular cross-section and had a circumference of 24.8 mm. with a standard deviation of only 0.07 mm. They could each be cut into six 15 mm. long filter tips, which when tested had a density of 0.05 g/cc$^3$, hardness 88 percent, $\Delta P_{10}$ 5 cms. water-gauge and TPM filtration efficiency 38 percent. On microscopic examination with a deep-focus microscope they had a complex open structure similar to that shown in FIG. 1, with many fibre elements bridging large single openings that took up most of the cell wall area of the foam.

In a comparative experiment, the die temperature was varied over the range 128° to 133°C. At the lower temperature, the extrusion became unstable with major variations about a reduced product diameter and an increase in density, whereas at the higher temperature the product diameter was drastically decreased and $\Delta P_{10}$ was greatly increased.

In another comparative experiment, the proportion of injected isobutylene was varied between 0.054 and 0.22 moles per 100 grams of the final extruded product whilst keeping the other extrusion conditions constant. The hardness of the product decreased with increase in the isobutylene concentrations, and although $\Delta P_{10}$ remained less than 15 cms. water-gauge over the range 0.054 to 0.19 moles isobutylene per 100 grams of the final extruded product, there was a sudden and steep increase in $\Delta P_{10}$ above an isobutylene concentration of 0.16 moles per 100 grams and at 0.22 moles per 100 grams $\Delta P_{10}$ was more than 25 cms. water-gauge.

EXAMPLE 2

This Example describes the production of a range of cigarette filters according to the invention, and demonstrates the variation in properties obtainable by control of the extrusion process.

High density polyethylene of density 0.965 grams/cc., crystalline melting point 135°C. and melt index 4.5 grams per 10 minutes (at 230°C. under a 2.16 kg weight) was blended with 1 percent by weight of polyethylene glycol of molecular weight 400 and with 20 percent of talc to act as nucleating agent and filler. The mixture was fed to the extruder and die used in Example 1. The screw speed was 21 revolutions per minute, the throughput was 50 grams per minute and isobutylene was injected as blowing agent at the rates shown in the table below. The temperature in the plasticating zone of the extruder, that is, the part upstream of the injection point, was 180°C. but cooling was applied downstream of the injection zone and as a result the melt temperature immediately behind the die was 142°C., measured using a fine thermocouple as described above. The die temperature, measured as described above, was 133°C. These conditions gave stable extrusion to a foamed polyethylene rod. After passing through air for 20 centimeters, the rod was pulled into a sizing and cooling system as described in Example 1. The rod had a circumference of 24.5 millimeters with a standard deviation of 0.05 millimeters. On cutting into 90 mm. lengths, and thence into 15 mm. cigarette filters, the following properties were measured:

TABLE I

| Isobutylene moles/100 g. final product | Density (g/cm³) | $\Delta P_{10}$ (cms H₂O) | TPM₁₅ (%) | Hardness (%) | Structure |
|---|---|---|---|---|---|
| 0.068 | 0.104 | 1.8 | 26 | 97 | Reticular. Bridging fibres |
| 0.085 | 0.082 | 3.2 | 40 | 96 | Reticular. Branched bridging fibres |
| 0.090 | 0.066 | 4.8 | 43 | 95 | Reticular. More highly branched fibres |
| 0.107 | 0.058 | 9.0 | 60 | 94 | Reticular. Fine bridging fibrous webs |
| 0.125 | 0.052 | 14.7 | 64 | 93 | Reticular. Intricate gossammer webs. |

EXAMPLE 3

This Example describes cigarette filters according to the invention of polypropylene, and their production by a method according to the invention.

Polypropylene of crystalline melting point about 170°C. and melt index 1.5 grams per 10 minutes (at 230°C. under a 2.16 kg weight) was blended with 0.1 percent by weight of polyethylene glycol of molecular weight 400 and 1 percent by weight of talc to act as a nucleating agent. The mixture was fed to the extruder and die used in Example 1, the screw speed being 22 revolutions per minute and the throughput 53 grams per minute, and isobutylene was injected at a rate corresponding to 0.142 mole per 100 grams of the final extruded product.

The temperature in the plasticating part of the extruder was 200°C., the melt temperature behind the die was 170°C. and the die temperature was 162°C.

These conditions gave stable extrusion to an open-celled foamed polypropylene rod having a smooth exterior skin. The interior of the rod consisted of open cells bridged by fibre elements. It was cut up into appropriate lengths that were found to be excellent cigarette filters.

EXAMPLE 4

This Example describes two further cigarette filters according to the invention.

The extrusion was as described in Example 1, except that calcium acetate was substituted for calcium propionate, 0.139 mole of isobutylene per 100 grams of the final extruded product was employed, the melt temperature was 137°C. and the die temperature was 132°C. The extruded rod had a micro-structure and surface skin similar to those of the product of Example 1, a circumference of 21 millimeters, density 0.047 g./cc. and $\Delta P_{10}$ 3.3 cms. water gauge. On being cut into appropriate lengths it made excellent cigarette filters.

In a further run using the same polyethylene and nucleating agent under the same conditions but injecting only 0.110 mole of isobutylene per 100 grams of the final extruded product, the extruded rod had a slightly more open structure with a similar surface skin and $\Delta P_{10}$ was 2.2 cms. water gauge. The circumference was 20.4 mm. and the density 0.057 g./cc. This product also made excellent cigarette filters.

EXAMPLE 5

This Example describes further cigarette filters according to the invention of high density polyethylene. In this case no nucleating agent was employed.

High density polyethylene of density 0.965 g./cc., crystalline melting point 135°C. and melt index 4.5 grams per 10 minutes (at 190°C. under a 2.16 kg weight) was fed to the extruder used in Example 1 but fitted with a circular orifice die of diameter 1.58 mm. and 0.2 mm. land. The screw speed was 21 revolutions per minute, the throughput was 67 grams per minute and isobutylene was injected at a rate corresponding to 0.17 mole per 100 grams of the polyethylene. The melt temperature was 137°C. and the die temperature was 126°C. The extrudate was a rod of fine open-celled foamed polyethylene having a smooth skin and a circumference 22 mm. Its density was 0.069 g./cc. and $\Delta P_{10}$ was 4.4 cms. water gauge. When cut up into 15 millimeter lengths it made excellent cigarette filters.

An experiment using the same polyethylene under the same conditions but with a die of the same diameter and land 3.18 mm. gave a foam cell structure that was not so fine as when the short land die was used.

EXAMPLE 6

This Example describes an open-cell foamed polyethylene resin according to the invention, a process for producing it by a preferred method and its use as a filter tip for a cigarette.

A dry blend of 100 parts by weight of high density polyethylene having a density of 0.96 grams per cubic centimeter and a melt index of 0.9 decigrams per minute, and 0.1 part by weight of polyethylene glycol having a molecular weight of about 400, was first prepared in a Banbury mixer. 1.0 Part by weight of talc as nucleating agent was then added and the mixing continued until the polyethylene glycol and talc were thoroughly dispersed throughout the blend.

The blend was placed in the hopper of an extruder of 3.81 cms. diameter and having a two stage screw. 0.16 Moles of isobutylene as blowing agent per 100 grams of the final extruded product were injected into the injection zone of the extruder and the heat-softened composition was extruded through a circular die orifice (diameter 1.58 mm.) at a throughput of 44 grams per minute, the various parts of the extruder being maintained at the following temperature (the melt temperature being about 138°C.):-

| | |
|---|---|
| Plasticating zone | 174°C. to 211°C. |
| Injection zone | 152.5°C. |
| Cooling zone | 157.0°C. |
| Die block zone | 123.5°C. |
| Die | 137.5°C. |

Figure 4:
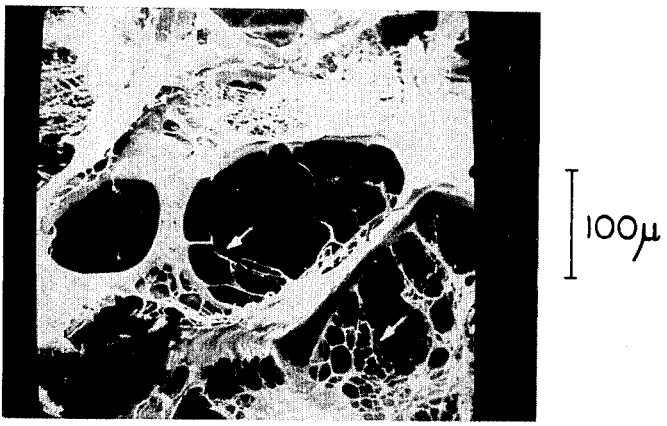
FIG. 4 illustrates the micro-structure of a portion of a further cigarette filter of the invention. It shows a section through a single cell of the foam and parts of the adjacent cells. The majority of the cell walls, for example those indicated by an arrow, have perforations bridged by fibre elements. In some instances the fibre elements are interconnected and form a web across part of a perforation.
Figure 5:
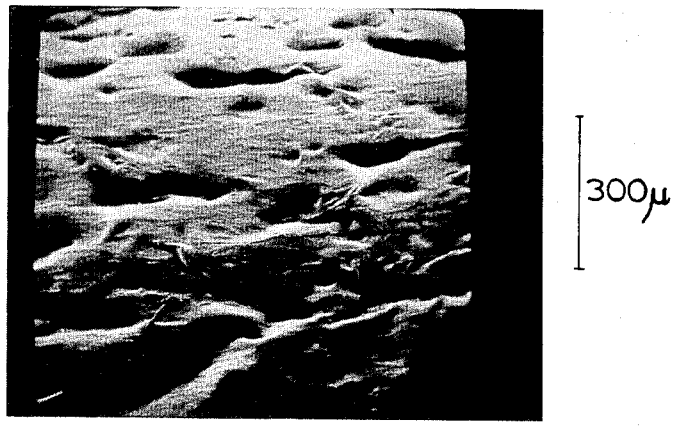
FIG. 5 shows the outer skin of an example of a cigarette filter according to the invention; this skin is non-porous and is smooth to the touch and eye.

A cylindrical polyethylene foamed rod about 8.4 mm. in diameter was produced with a density of 0.038 grams per cubic centimeter. On examination by electron-scan microscopy the foamed strand was observed to have an impervious white outer skin similar to that shown in FIG. 5, and an open-cell structure, a part of which is illustrated in FIG. 4 of the accompanying photographs.

Samples of the foam were examined by means of electron scan microscopy and it was seen that more than half of the cells had one or more walls containing perforations bridged by fibre elements. More than 85 per cent of the cells contained one or more cell walls perforated in the way described and it was observed that in general the majority of the individual walls of those cells were perforated. Those cell walls that had perforations contained relatively few perforations, for example between 1 and 4 perforations, and these perforations occupied the major part of the total surface area of each cell wall. Some of the fibre elements bridging the perforations were detached from each other whilst others were interconnected in a two dimensional array or network, the majority of the perforations being bridged by fibre network. The average diameter of the cells of the foam was approximately 0.03 centimeter. Some of the other properties of the foamed rod are given in Table 2 below.

The rod was chopped up into pieces about 1.5 centimeters long and these were used as filter tips for cigarettes. When the cigarette was smoked it was found that the tips had a pleasing resilience without any adverse effect on taste or detectable resistance to the flow of smoke. The cigarette tip had an excellent overall appearance, a smooth feel and a fine cell structure. When the tips were later cut out they were found to have removed a considerable quantity of tar from the smoke.

EXAMPLE 7

This Example describes an open-cell foamed polyethylene resin according to the invention, a process for producing it by a preferred method and its use as a filter tip for a cigarette.

A blend of 100 parts by weight of high density polyethylene having a density of 0.958 grams per cubic centimeter and a melt index of 4.5 decigrams per minute, and 0.1 part by weight of polyethylene glycol having a molecular weight of about 400, was first prepared in a Banbury mixer. 1.0 Part by weight of talc as nucleating agent was then added and the mixing continued until polyethylene glycol and talc were thoroughly dispersed throughout the blend.

The blend was placed in the hopper of an extruder of 3.81 cms. diameter and having a two stage screw. 0.141 Moles of isobutylene as blowing agent per 100 grams of the final extruded product were injected into the injection zone of the extruder and the heat-softened composition was extruded through a circular die orifice (diameter 1.58 mm.) at a throughput of 42 grams per minute, the various parts of the extruder being maintained at the following temperatures:

| | |
|---|---|
| Plasticating zone | 169. to 210.5°C. |
| Injection zone | 160°C. |
| Cooling zone | 137°C. |
| Die block zone | 111°C. |
| Die | 122.5°C. |

Figure 2:
FIG. 2 illustrates the micro-structure of another cigarette filter of the invention. It shows a section through a single cell of the foam and parts of the adjacent cells, and again in this example an individual cell wall is almost entirely taken up by a single perforation that is bridged by a number of interconnected fibre elements forming a web. This is most clearly shown in the cell wall indicated by an arrow.
Figure 3:
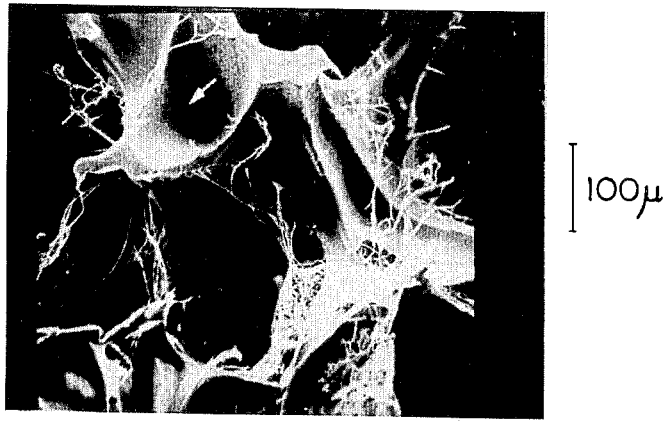
FIG. 3 illustrates the micro-structure of a further cigarette filter of the invention. It shows a section through a single cell and parts of the adjacent cells, some of them fragmentary. Some of the fibre elements that bridge the perforations are detached one from another, being relatively free of interconnection; others form a web similar to that seen in FIG. 2.

A cylindrical polyethylene foamed rod 7.9 mm. in diameter was produced with a density of 0.048 grams per cubic centimeter. On examination the foamed strand was observed to have an impervious white outer skin similar to that shown in FIG. 5, and an open-cell structure, parts of which are illustrated in FIGS. 2 and 3 of the accompanying photographs.

Samples of the foam were examined by means of electron scan microscopy and it was seen that more than half the cells had one or more walls containing perforations bridged by fibre elements. More than 85 per cent of the cells contained one or more cell walls perforated in the way described and it was observed that the majority of the walls of these cells were perforated. Those cell walls that had perforations contained relatively few perforations, for example from 1 to 4 perforations, and these perforations occupied the major part of the total surface area of each cell wall. Some of the fibre elements bridging the perforations were detached from each other, whilst others were interconnected in a two dimensional array or network, the majority of the perforations being bridged by fibre networks. The average diameter of the cells of the foam was approximately 0.03 centimeter. Some of the other properties of the foamed rod are given in Table 2 below.

The rod was chopped into pieces about 1.5 centimeters long and these were used as filter tips for cigarettes. When the cigarette was smoked it was found that the tips had a pleasing resilience without any adverse effect on taste or detectable resistance to the flow of smoke. The overall appearance of the filter tip was excellent. It had a smooth outer skin and a fine cell structure. When the tips were later cut out they were found to have removed a considerable quantity of tar from the smoke.

EXAMPLE 8

This Example describes an open-cell foamed polyethylene resin according to the invention and a process for producing it employing a high level of nucleating agent in order to obtain a filter tip for a cigarette having special properties.

A dry blend of 100 parts by weight of high density polyethylene having a density of 0.965 grams per cubic centimeter and a melt index of 4.5 decigrams per minute, and 1 part by weight of polyethylene glycol having a molecular weight of about 400, was first prepared in a Banbury mixer. 20.0 Parts by weight of talc as nucleating agent were then added and the mixing continued until the polyethylene glycol and talc were thoroughly dispersed throughout the blend.

The blend was placed in the hopper of an extruder of 3.81 cms. diameter and having a two stage screw. 0.062 Moles of isobutylene as blowing agent per 100 grams of the final extruded product were injected into the injection zone of the extruder and the heat-softened composition was extruded through a circular die orifice (diameter 1.98 mm.) at a throughput of 49.1 grams per minute, the various parts of the extruder being maintained at the following temperatures (the melt temperature being about 140°C.):

| | |
|---|---|
| Plasticating zone | 185°C. to 210°C. |
| Injection zone | 182°C. |
| Cooling zone | 142.5°C. |
| Die block zone | 118°C. |
| Die | 130°C. |

A cylindrical polyethylene foamed rod 8.8 millimeters in diameter was produced with a density of 0.069 grams per cubic centimeter. On examination the foamed strand was observed to have a very smooth impervious white outer skin similar to that illustrated in FIG. 5, and an open-cell structure similar to that illustrated in FIGS. 2 to 4 of the accompanying photographs.

Samples of the foam were examined by means of electron scan microscopy and it was seen that more than half of the cells had one or more walls containing perforations bridged by fibre elements.

More than 85 per cent of the cells contained one or more cell walls perforated in the way described and it was observed that in general the majority of the individual walls of these cells were perforated. Those cell walls that had perforations contained relatively few perforations, for example from 1 to 4 perforations, and these perforations occupied the major part of the total surface area of each cell wall. Some of the fibre elements bridging the perforations were detached from each other whilst others were interconnected in a two dimensional array or network, the majority of the perforations being bridged by fibre networks. The average diameter of the cells of the foam was approximately 0.03 centimeter. Some of the other properties of the foamed rod are given in Table 2 below.

The rod was chopped up into pieces about 1.5 centimeters long and these were used as filter tips for cigarettes. When the cigarette was smoked it was found that the tips had a specially good resilience and hardness without any adverse effect on taste or detectable resistance to the flow of smoke. The cigarette tip had an excellent overall appearance, a specially smooth feel and a fine cell structure. When the tips were later cut out they were found to have removed a considerable quantity of tar from the smoke.

TABLE 2

| Property of 15 mm. long cigarette filter tip | Example 6 | Example 7 | Example 8 |
|---|---|---|---|
| Weight (mg.) | 33.8 | 34.8 | 48.0 |
| Density (grams per cubic centimeter) | 0.038 | 0.048 | 0.069 |
| *Tar uptake per tip (mg.) | 23.0 | 23.2 | 12.0 |
| *Tar uptake as percentage of filter weight (per cent of original weight) | 68.1 | 66.7 | 25.0 |
| **Pressure drop $P_{15}$ (centimeters water gauge) | 17 | 7 | 4.0 |
| Hardness (percent) | 90.2 | 81.0 | 97.7 |

*Tar uptake figures are not the same as "TPM filtration efficiency". They were obtained by weighing a filter tip before incorporation in a cigarette and after the cigarette had been smoked and subtracting the first reading from the second.

**Pressure drop $\Delta P_{15}$ is approximately one-and-a-half times $\Delta P_{10}$.

EXAMPLE 9

This Example describes the production of a cigarette filter according to the invention, using chalk as nucleating agent.

One hundred parts by weight of high-density polyethylene of density 0.965 grams per cubic centimeter, crystalline melting point 135°C. and melt index 4.5 grams per 10 minutes (at 230°C. under a 2.16 kilogram weight) were blended with three parts by weight of polyethylene glycol of molecular weight 400 and thirty parts by weight of chalk (Britomya BSH) to act as nucleating agent. (Britomya BSH in a trade mark for a ground chalk of maximum particle size 10 microns and average particle size 2.5 microns, surface-treated with stearic acid to make it wettable by organic fluids). The mixture was fed to the extruder and die used in Example 1. The screw speed was 20 revolutions per minute, the throughput was 59 grams per minute and isobutylene was injected as blowing agent at a rate corresponding to 0.097 moles per 100 grams of the final extruded product. The temperature in the plasticating zone of the extruder, that is, the part upstream of the injection point, was 180°C. but cooling was applied downstream of the inject zone and as a result the melt temperature immediately behind the die was 138°C., measured using a fine thermocouple as described above. The die temperature, measured as described above, was 134°C. The pressures within the extruder barrel were 10.5 kilograms per square centimeter in the post-injection zone, 14.1 kilograms per square centimeter in the cooling zone and 49.2 kilograms per square centimeter immediately behind the die. These conditions gave stable extrusion to a foamed polyethylene rod. After passing through air for 20 centimeters, the rod was pulled into a sizing and cooling system as described in Example 1. The rod had a smooth outer skin and a fine uniform cell structure, and had a circumference of 24.5 millimeters with a standard deviation of 0.1 millimeter. On cutting the rod into 90-millimeter lengths, and thence into 15-millimeter cigarette filters, the following properties were measured:

| | |
|---|---|
| Density | 0.065 grams per cubic centimeter |
| $\Delta P_{10}$ | 2.8 centimeters of water |
| TPM | 29.7% |
| Hardness | 92% |

On examination by electron-scan microscopy, the foam structure was seen to be composed of a reticular skeleton in which a majority of the cell walls had each a large perforation extending over most of the area of the wall and which was bridged by a number of fine fibre elements.

The cigarette filters could be incorporated into cigarettes by high-speed machinery, and they did not produce any taste or otherwise spoil the satisfaction given by the cigarettes when smoked.

EXAMPLE 10

This Example describes the production of a cigarette filter according to the invention, using ground calcite as nucleating agent.

One hundred parts by weight of high-density polyethylene of density 0.965 grams per cubic centimeter, crystalline melting point 135°C. and melt index 4.5 grams per 10 minutes (at 230°C. under a 2.16 kilogram weight) were blended with two parts by weight of polyethylene glycol of molecular weight 400 and twenty parts by weight of ground calcite of average particle size 5 microns to act as nucleating agent. The mixture was fed to the extruder and die used in Example 1. The screw speed was 16 revolutions per minute, the throughput was 57 grams per minute and isobutylene was injected as blowing agent at a rate corresponding to 0.1 mole per 100 grams of extruded product. The temperature in the plasticating zone of the extruder, that is, the part upstream of the injection point, was 180°C. but cooling was applied downstream of the injection zone and as a result the melt temperature immediately behind the die was 138.5°C., measured using a fine thermocouple as described above. The die temperature, measured as described above, was 134°C. The pressures within the extruder barrel were 14.3 kilograms per square centimeter in the post-injection zone, 17.6 kilograms per square centimeter in the cooling zone and 70.3 kilograms per square centimeter immediately behind the die. These conditions gave stable extrusion to a foamed polyethylene rod. After passing through air for 20 centimeters, the rod was pulled into a sizing and cooling system as described in Example 1. The rod had a circumference of 24.7 millimeters with a standard deviation of 0.1 millimeter. On cutting into 90-millimeter lengths, and thence into 15-millimeter cigarette filters, the following properties were measured:

| | |
|---|---|
| Density | 0.055 grams per cubic centimeter |
| $\Delta P_{10}$ | 8.9 centimeters of water |
| Hardness | 92% |

On examination by electron-scan microscopy, the foam structure was similar to that of the foamed resin of the previous Example although the cells were smaller and the fibre elements were finer.

The cigarette filters could be incorporated into cigarettes by high-speed machinery, and they did not produce any taste or otherwise spoil the satisfaction given by the cigarettes when smoked.

EXAMPLES 11 to 19

These Examples describe the production of a series of different cigarette filters according to the invention; a number of nucleating agents and various extrusion conditions are employed to give filters of differing characteristics.

Figure 6:
FIG. 6 illustrates a further example of an open-cell foamed resin cigarette filter according to the invention.
Figure 7:
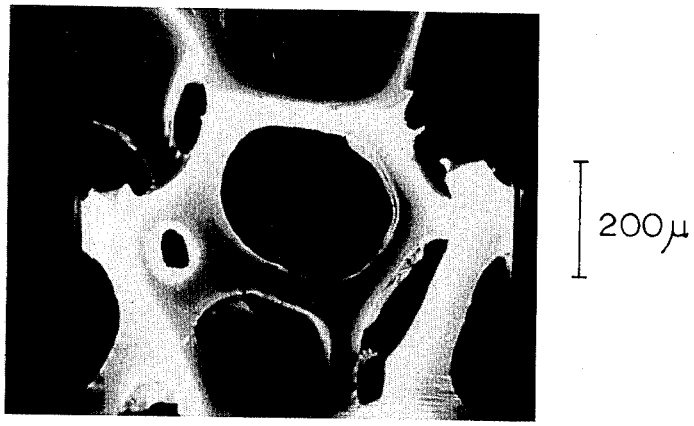
FIGS. 7 and 8 are photographs of different open-cell foamed resins included for the purposes of comparison. The sections photographed were cut from an appropriate extruded element, and accordingly in some instances show loose "ends" and fragments arising from the cutting operation.
Figure 8:
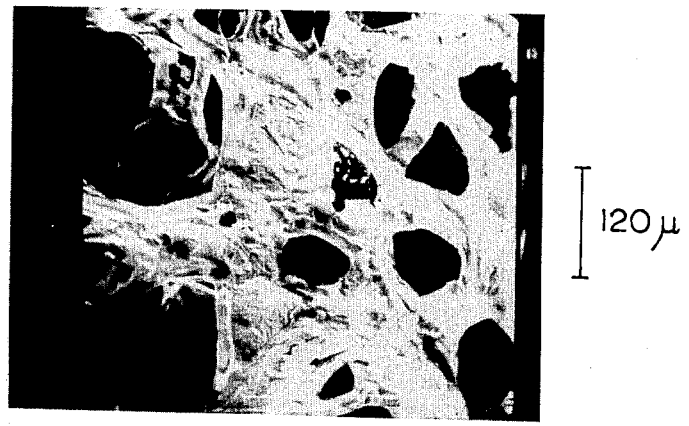

In a series of runs, the procedure described in Example 9 was followed except that the nucleating agent and extrusion conditions were as shown in Table 3 below and the amount of polyethylene glycol employed in each run corresponded to 10 percent by weight of the nucleating agent employed in that run. Table 3 also shows the properties of the cigarette filters obtained. The cell structure of the filter of Example 18 is illustrated in FIG. 6.

TABLE 3

| Example No. | Nucleating* agent % of resin | Screw speed RPM | Throughput g./minute | T melt °C. | T die °C. | Isobutylene moles/100g product | TPM % | $\Delta P_{10}$ cms.$H_2O$ | Hardness % | Density g/cc. |
|---|---|---|---|---|---|---|---|---|---|---|
| 11 | 1.9% CaAc + 1.9% CaPr | 21 | 48 | 138 | 130 | 0.121 | 49 | 4.6 | 91 | 0.055 |
| 12 | 5% CaPr | 21 | 47 | 132 | 130 | 0.136 | 34 | 3.8 | 89 | 0.05 |
| 13 | 10% BSH | 20 | 56.5 | 136 | 133 | 0.143 | 41 | 4.9 | 92 | 0.07 |
| 14 | 2.5 CaAc 2.5 CaPr | 21 | 45 | 141 | 133 | 0.102 | 60 | 5.0 | 68 | 0.047 |
| 15 | 5% CaAc $H_2O$ | 21 | 45 | 142 | 133 | 0.118 | 53 | 6.3 | 88 | 0.064 |
| 16 | 10% BSH 0.5 Water | 20 | 38 | 137 | 128 | 0.125 | 45 | 6.2 | 88 | N/A |
| 17 | 1% BSH 1% $Na_2CO_3$ | 20 | 48 | 137 | 134 | 0.107 | 50.5 | 3.1 | 93 | N/A |
| 18 | 30% BSH | 20 | 59 | 138 | 134 | 0.107 | 52.4 | 3.6 | 92 | 0.07 |

TABLE 3-continued

| Example No. | Nucleating* agent % of resin | Screw speed RPM | Throughput g./minute | T melt °C. | T die °C. | Isobutylene moles/100g product | TPM % | $\Delta P_{10}$ cms.$H_2O$ | Hardness % | Density g/cc. |
|---|---|---|---|---|---|---|---|---|---|---|
| 19 | 30% BSH | 20 | 59 | 138 | 134 | 0.089 | 40 | 3.0 | 89.5 | 0.07 |

*Notes:
(a) CaAc = Calcium acetate
(b) CaPr = Calcium propionate
(c) CaAc.$H_2O$ = Calcium acetate monohydrate
(d) BSH = Britomya BSH as described in Example 9.

EXAMPLE 20

This Example describes three different cigarette filters according to the invention in which the resin was polypropylene.

The polypropylene employed had a crystalline melting point about 170°C. and melt index 1.5 grams per 10 minutes (at 230°C. under a 2.16 kilogram weight). Three runs were carried out by the procedure described in Example 9; in all three the extruder screw speed was 20 revolutions per minute and the throughput was 48 grams per minute. In the first two runs the melt temperature was 170°C. and the die temperature was 162°C., and in the third run the melt temperature was 168°C. and the die temperature was 162°C.

In the first run the nucleating agent was 2 percent of talc based on the weight of polypropylene, and 10 percent by weight of polyethylene glycol of molecular weight 400, based on the weight of talc, was used as adhesive agent. The blowing agent was isobutylene in an amount corresponding to 0.15 moles per 100 grams of final extruded product.

In the second and third runs, the nucleating agent was 1 percent by weight of talc based on the weight of polypropylene and the adhesive agent was 10 percent by weight of polyethylene glycol based on the weight of talc. The blowing agent was isobutylene, in amounts corresponding to 0.15 and 0.19 moles per 100 grams of final extruded product respectively.

Each run gave a fine-celled foamed polypropylene rod of diameter 1.1 centimeter, having the following properties:

|  | Run No. 1 | Run No. 2 | Run No. 3 |
|---|---|---|---|
| $\Delta P_{10}$ (cms. $H_2O$) | 2.5 | 1.8 | 3.5 |
| Hardness (%) | 84 | 78 | 74 |
| Density (g./cc) | 0.039 | 0.036 | 0.025 |

The foamed elements were seen on examination by electron-scan microscopy to consist of a reticular structure bridged by webs of fibre elements, similar to that shown in FIG. 6.

When cut into appropriate lengths these rods were suitable for use as cigarette filters although somewhat thicker than is customary. Nevertheless, when the filters were incorporated into hand-made cigarettes of the appropriate diameter and the cigarettes were smoked, a high proportion of tobacco tar was removed from the smoke. Thinner rods could be produced if desired by using a smaller diameter die; these would have slightly higher values for $\Delta p 10$ and slightly lower values for hardness.

In a comparative experiment carried out under conditions similar to those of the second and third runs but using 0.25 moles of isobutylene per 100 grams of final extruded produce, $\Delta P_{10}$ of the product was unacceptably high for use as a cigarette filter.

EXAMPLE 21

This Example describes the production of high-density polyethylene cigarette filters according to the invention by extrusion using dichlorodifluoromethane as blowing agent.

The procedure was similar to that of Example 9, dichlorodifluromethane being used as blowing agent and the extrusion conditions being as follows:

| Nucleating agent : | 10% by weight Britomya BSH based on polyethylene. |
|---|---|
| Adhesive agent : | 5% by weight polyethylene glycol (M.W. 400) based on nucleating agent. |
| Extruder speed | 20 revolutions per minute. |
| Throughput | 53 grams per minute. |
| Melt temperature : | 138°C. |
| Die temperature : | 134°C. |
| Amount of blowing agent : | 0.091 moles per 100 grams of final extruded product. |

The cigarette filters produced had $\Delta P_{10}$ 2.2 centimeters of water gauge and hardness 78 percent and when smoked in cigarettes extracted a good proportion of the tar particulate matter in the smoke. The cell structure was fairly fine and similar to that of the filters of Example 9.

Experiments using propylene as blowing agent gave results substantially the same as those obtained using isobutylene.

We claim:

1. A rod shaped cigarette filter comprised of a polypropylene foam or a foam of high density polyethylene, said foam having a substantially open-cell structure wherein more than half of the cells present contain cell walls which are perforated, and wherein the microstructure of said foam is characterized by the presence of numerous fine fibre-like elements having thicknesses within the range of from about 0.1 to 2 microns which bridge across said perforations in the cell walls, said fibre-like elements being interconnected with each other or with the part of the cell wall that forms the boundary of the perforation and thereby being substantially free of loose ends; said cigarette filter having a TPM filtration efficiency of from 20 to 60 percent, a $\Delta P_{10}$ of from about 0.5 to 15 centimeters water gauge, and a hardness of from about 50 to 100 percent, said percent hardness being determined by subjecting a 120 millimeter length sample of said cigarette filter rod of predetermined initial diameter to compression under a 300 gram load for 15 seconds and thereafter measuring the rod diameter to determine the decrease in initial diameter, the percent hardness is then calculated from the equation:

Percent hardness = $[(D - A)/D] \times 100$ wherein D represents the initial diameter of the rod and A represents the decrease in said initial diameter following 15 seconds under said load.

2. An extruded rod of substantially open-cell foam as defined in claim 1 which can be cut up into filters.

3. A cigarette having a filter as defined in claim 1.

4. A cigarette filter in accordance with claim 1 in which said foam is comprised of a high density polyethylene, wherein said high density polyethylene has a density in the range of from about 0.950 and 0.970 grams per cubic centimeter and a melt index from about 1 to 8 grams per 10 minutes.

5. A cigarette filter in accordance with claim 1 wherein more than half of the cell walls of said foam each contain a perforation that takes up from about 70 to 95 percent of the total area of the cell wall, giving a reticular structure formed by the boundaries between the remaining parts of said cell wall.

6. A cigarette filter in accordance with claim 1 wherein the filter has a hardness of from 80 to 100 percent, a $\Delta P_{10}$ of from 0.5 to 10 centimeters water gauge, and a TPM filtration efficiency of from 30 to 60 percent.

7. A cigarette filter in accordance with claim 1 in which there are at least 100 fibre-like elements bridging each perforation.

8. A cigarette filter in accordance with claim 1 in which said foam is comprised of a polypropylene resin having a melt index of from 1 to 12 grams per 10 minutes as measured at a temperature of 190°C. and under a weight of 2.16 kilograms.

9. A cigarette filter in accordance with claim 1 wherein more than half of the cell walls of said foam are perforated.

10. A composite filter for a cigarette wherein a portion thereof consists of a rod shaped foam as defined in claim 1.

11. A composite filter in accordance with claim 10 wherein the rod shaped foam is high-density polyethylene.

12. A cigarette having a composite filter as defined in claim 10.

13. A rod shaped cigarette filter comprised of a polypropylene foam or a foam of high density polyethylene, said foam having a substantially opencell structure wherein more than half of the cells present contain cell walls which are perforated, and wherein the microstructure of said foam is characterized by the presence of two-dimensional webs of interconnected fibre-like elements which extend across said perforations in the cell walls, said interconnected fibre-like elements having thicknesses within the range of from 0.1 to 2 microns; said cigarette filter having a TPM filtration efficiency of from 20 to 60 percent, a $\Delta P_{10}$ of from about 0.5 to 15 centimeters water gauge, and a hardness of from about 50 to 100 percent, said percent hardness being determined by subjecting a 120 millimeter length sample of said cigarette filter rod of predetermined initial diameter to compression for 15 seconds under a 300 gram load and thereafter measuring the rod diameter to determine the resulting decrease in said initial diameter, the percent hardness is then calculated from the equation:

Percent hardness = $[(D - A)/D] \times 100$ wherein D represents the initial diameter of the rod and A represents the decrease in said initial diameter following 15 seconds under said load.

14. A cigarette filter in accordance with claim 13 in which said foam is comprised of a high density polyethylene, wherein said high density polyethylene has a density in the range of from about 0.950 and 0.970 grams per cubic centimeter and a melt index from about 1 to 8 grams per 10 minutes.

15. A cigarette filter in accordance with claim 13 wherein more than half of the cell walls of said foam each contain a perforation that takes up from about 70 to 90 percent of the total area of the cell wall, giving a reticular structure formed by the boundaries between the remaining parts of said cell walls.

16. A cigarette filter in accordance with claim 13 wherein the filter has a hardness of from 80 to 100 percent, a $\Delta p_{10}$ of from 0.5 to 10 centimeters water gauge, and a TPM filtration efficiency of from 30 to 60 percent.

17. A cigarette filter in accordance with claim 13 in which said foam is comprised of a polypropylene resin having a melt index of from 1 to 12 grams per 10 minutes as measured at a temperature of 190°C. and under a weight of 2.16 kilograms.

18. A cigarette filter in accordance with claim 13 wherein more than half of the cell walls of said foam contain perforations.

* * * * *